United States Patent [19]
Ikeda et al.

[11] Patent Number: 6,023,388
[45] Date of Patent: Feb. 8, 2000

[54] DATA RECORDING APPARATUS AND DATA REPRODUCING APPARATUS

[75] Inventors: Katsumi Ikeda; Hironori Miyoshi; Masaki Yamada, all of Kanagawa, Japan

[73] Assignee: Sony Corporation, Tokyo, Japan

[21] Appl. No.: 08/882,155

[22] Filed: Jun. 25, 1997

[30] Foreign Application Priority Data

Jun. 27, 1996 [JP] Japan .................................. 8-168022

[51] Int. Cl.⁷ .................................................. G11B 15/18
[52] U.S. Cl. ........................................................ 360/72.1
[58] Field of Search .............................. 360/27, 48, 69, 360/72.1

[56] References Cited

U.S. PATENT DOCUMENTS

| | | | |
|---|---|---|---|
| 5,134,529 | 7/1992 | Inazawa et al. | 360/48 |
| 5,710,857 | 1/1998 | Yamasaki et al. | 386/52 |
| 5,818,652 | 10/1998 | Ozaki et al. | 360/27 |
| 5,852,534 | 12/1998 | Ozue et al. | 360/69 |

*Primary Examiner*—William J. Klimowicz
*Attorney, Agent, or Firm*—Jay H. Maioli

[57] ABSTRACT

A data recording device and a data reproducing device for appending data in a data storage device without requiring that data be read up to the last group directly before an end-of-data area. A system controller controls a recording data processing system, a data recording/reproducing unit, a playback data processing system and a tracking control system for recording the identification information of the last group in an end-of-data (EOD) area and for reading out the identification information of the last group from the EOD area.

8 Claims, 6 Drawing Sheets

DATA RECORDING APPARATUS AND DATA REPRODUCING APPARATUS

BACKGROUND OF THE INVENTION

1. Field of the Invention

This invention relates to a data recording device and a data reproducing device for recording data supplied from an information processing device, such as a personal computer or a work station.

2. Description of the Related Art

Up to now, a so-called data storage device has been known as a recording/reproducing apparatus capable of recording/reproducing digital data for a magnetic tape. Depending on the tape length of a tape cassette, as a media, such data storage device can have a voluminous recording capacity of the order of tens to hundreds of gigabytes. For this reason, such data storage device is widely used for backup of data recorded on a media, such as a hard disc of a main body member of a computer. The data storage device is also conveniently used for storage of picture data of a large data size.

As such data storage device, such a device is proposed in which data is recorded and/or reproduced in accordance with a helical scan system by a rotary head using, for example, a tape cassette of an 8 mm VTR.

In the above-described data storage device employing an 8-mm VTR tape cassette, a small computer system interface (SCSI), for example, is used as an input/output interface for recording/reproducing data.

During recording, data supplied from, for example, a host computer, is entered via SCSI. This input data is transmitted in terms of a pre-set fixed length data set as a unit. The input data is compressed in accordance with a pre-set system, if necessary, so as to be stored temporarily in a buffer memory. The data thus stored in the buffer memory is furnished to the recording/reproducing system in terms of a pre-set fixed length, termed a group, so as to be recorded by a rotary head on a magnetic tape of a tape cassette.

During reproduction, data of a magnetic tape is read out by the rotary head for storage transiently in a buffer memory. The data from the buffer memory, if previously compressed, is expanded so as to be sent via SCSI to the host computer.

Meanwhile, data on the magnetic tape forms a partition with which to enable data reproduction or data writing. The data recording unit in a given partition can be divided in terms of pre-set units termed groups, as described above, so that recording on the magnetic tape can be done based on this group unit. The end of the partition data area is clarified by an end-of-data (EOD) area in which only the information specifying the end of the data area is recorded.

If it is desired to append data in such data storage device, it is necessary to move to a directly previous group, that is the last group, after confirming the end of the data area by the EOD area, in order to acquire the count information recorded in this last group along with data, such as group count, file mark count, save set count or record count, as well as the data appending point information. That is, if data is to be appended in the conventional data storage device, the last group directly previous to EOD needs to be read, thus complicating the operation.

In addition, if dust and dirt, for example, is affixed to the rotary head to render it impossible to read the last group itself, the data appendage operation itself becomes impossible.

SUMMARY OF THE INVENTION

It is therefore an object of the present invention to provide a data recording device whereby data appendage time can be shortened to improve the operational reliability.

It is another object of the present invention to provide a data reproducing device whereby the count information of the last group can be grasped even in cases wherein the last group cannot be read.

In one aspect, the present invention provides a data recording apparatus for recording grouped recording data and the identification information on a tape-shaped recording medium including recording data processing means for appending the identification information to the recording data by way of recording processing, recording means for recording signals supplied from the recording data processing means on the tape-shaped recording medium, tracking control means for controlling the tape running system of the recording means and controlling means for controlling the recording data processing means, recording means and the tracking control means for recording the identification information of the last group in an end-of-data area. In this manner, the time for appending data can be shortened for raising operational reliability.

In another aspect, the present invention provides a data reproducing apparatus for reproducing the grouped recording data and the identification information recorded on a tape-shaped recording medium including read-out means for reading out recording data and the accompanying identification information from the tape-shaped recording medium, playback data processing means for performing signal reproducing processing on a read-out output from the read-out means for producing a playback output, tracking control means for controlling the tape running system of the recording means and controlling means for controlling the read-out means, playback data processing means and the tracking control means for detecting the end-of-data area and for reproducing the identification information for the last group of the recording data contained in the end-of-data area. In this manner, the count information of the last group can be grasped even if the last group cannot be read.

DESCRIPTION OF THE PREFERRED EMBODIMENTS

Figure 1:
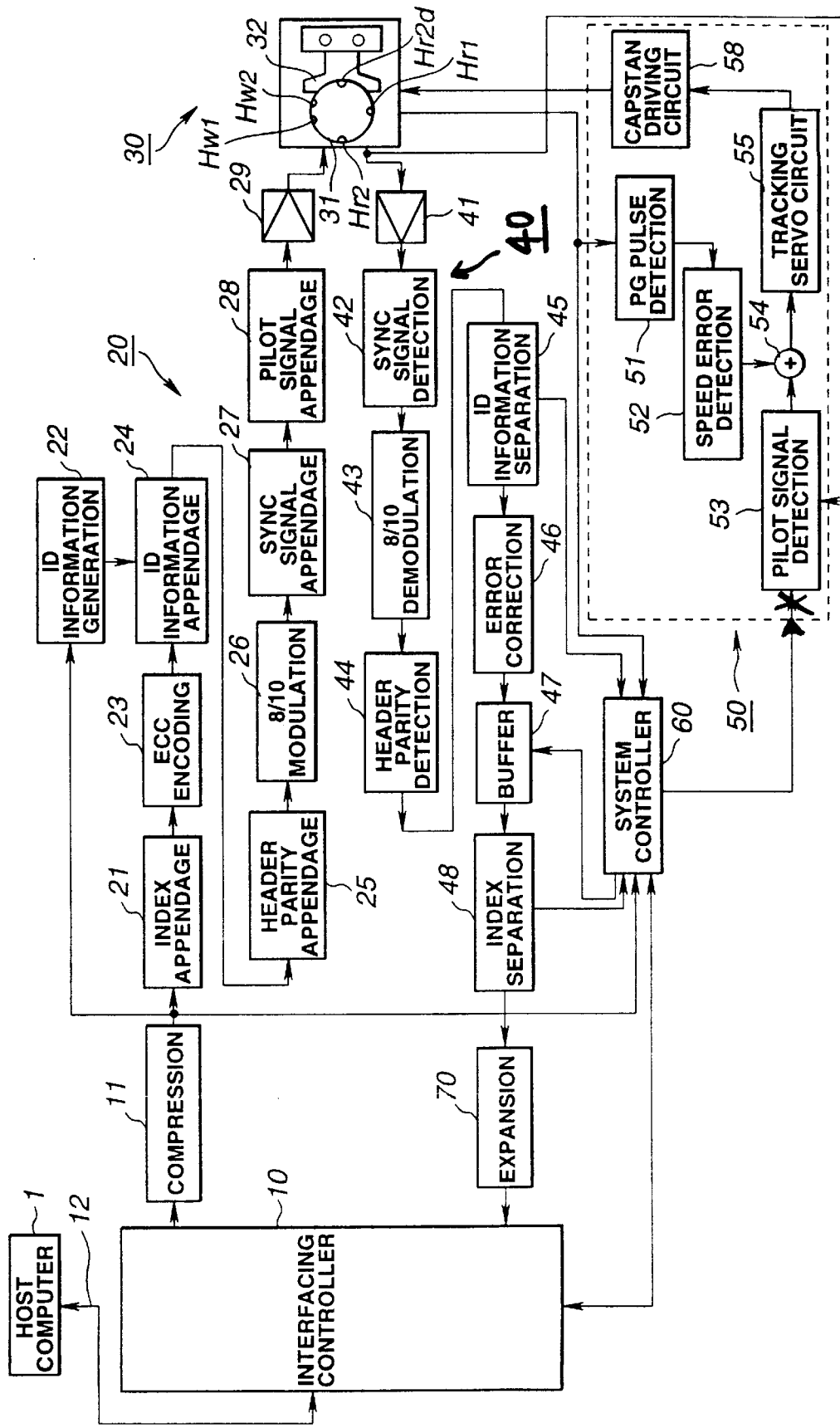
FIG. 1 is a schematic block diagram showing the structure of a data storage device as an embodiment of the data recording device and the data reproducing device according to the present invention.

Referring to the drawings, preferred embodiments of a data recording device and a data reproducing device according to the present invention will be explained in detail. These embodiments are directed to a data storage device for recording/reproducing data from an information processing device, such as host computer, on or from a magnetic tape. This data storage device records and/or reproduces data by a helical scan system on a magnetic tape of a tape cassette having a tape width of 8 mm.

This data storage device includes an interfacing controller 10 for data exchange with a host computer 1, a recording data processing system 20 for processing data from the interfacing controller 10 for conversion to data of a pre-set format and a recording/reproducing unit 30 for recording the data from the recording data processing system 20 on a magnetic tape and reproducing the magnetic tape, as shown for example in FIG. 1. The present data storage device also includes a reproducing data processing system 40 for processing a reproduced output from the recording/reproducing unit 30 for reproducing data recorded on the magnetic tape, a tracking control system 50 for controlling the tape running system of the recording/reproducing unit 30 and a system controller 60 for controlling the recording data processing system 20, recording/reproducing unit 30, reproducing data processing system 40 and the tracking control system 50 for recording the identification information of the last group also in the EOD area and for reading out the identification information for the last group from the EOD area.

In the present data storage device, the interfacing controller 10 is a so-called small computer system interface (SCSI) and operates for furnishing data from the external host computer 1 to the recording data processing system 20, while furnishing the recording data reproduced by the reproducing data processing system 40 to the host computer 1.

In the present data storage device, data is sequentially entered, during data recording, from the host computer 1 via SCSI interfacing controller 10 to an encoding (compression) circuit 11.

If necessary, the encoding circuit 11 encodes the input data in accordance with a pre-set system. If an encoding system by ID code, for example, is used as an encoding system, a dedicated code is allocated to a letter string processed in the past for storage in the form of a dictionary. The letter string entered subsequently is compared to the contents of the dictionary. Should the letter string of the input data be coincident with the dictionary code, this letter string data is replaced by the dictionary code. To input letter string data not coincident with the dictionary contents are sequentially accorded new codes for registration on the dictionary. Data encoding (compression) proceeds in this manner by registering the input letter string data on the dictionary and by substituting the dictionary codes for the letter string data.

The recording data processing system 20 includes an index appendage unit 21 for appending the index information to recording data furnished via interfacing controller 10, and an ID information generator 22 for generating the identification information as later explained. The recording data processing system 20 also includes an error correction code encoder (ECC encoder) 23 for appending error correction codes, such as C1, C2 or C3 parity, as later explained, to the recording data from the index appendage unit 21 by way of error correction encoding, and an ID information appendage unit 24 for appending the ID information and the block addresses from the ID information generator 22 to the error-correction-encoded recording data.

The recording data processing system 20 also includes a header parity appendage unit 25 for appending header parity to the recording data from the ID information appendage unit 24 and an eight-to-ten modulation unit 26 for 8/10 modulating the recording data furnished from the header parity appendage unit 25. The recording data processing system 20 also includes a synchronization signal appendage unit 27 for appending the synchronization signal to the recording data furnished from the eight-to-ten modulation unit 26, and a pilot signal appendage unit 28 for appending a pilot signal for automatic track finding (ATF) to the recording data from the synchronization signal appendage unit 27. The recording data processing system 20 additionally includes an amplifier 29 for amplifying the recording data furnished from the pilot signal appendage unit 28.

The recording/reproducing unit 30 includes a rotary drum 31 for rotating two recording heads $H_{w1}$, $H_{w2}$ having respective different azimuth angles and three reproducing magnetic heads $H_{r1}$, $H_{r2}$ and $H_{r2d}$ having respective different azimuth angles with an inclination relative to the running direction of the magnetic tape.

The reproducing data system 40 includes an amplifier 41 for amplifying a playback output of a slanted track on a magnetic tape furnished from the recording/reproducing unit 30, and a synchronization signal detector 42 for detecting the synchronization signal from the playback output furnished from the amplifier 41, converting the playback output to a binary signal, correcting the binary signal for jitter and outputting the resulting corrected signal. The reproducing data system 40 also includes an 8/10 demodulation unit 43 for 8/10 demodulating the binary playback output from the synchronization signal detector 42 and a header parity check unit 44 for parity-checking the playback output from the 8/10 demodulation unit 43.

The reproducing data system 40 additionally includes an ID information separator 45 for separating the ID information from the playback output from the header parity check unit 44 and an error correction processing unit 46 for error correction processing the playback data from the ID information separator 45 freed of the ID information. The reproducing data system 40 further includes a buffer 47 for transiently storing the playback data corrected for errors by the error correction processing unit 46 and an index separator 48 for separating the index from the playback data stored in the buffer 47.

The tracking control system 50 includes a PG pulse detector 51 fed with PG pulses corresponding to the rotation of the rotary drum 31 from the recording/reproducing unit 30 and a speed error detector 52 for detecting the speed error from a detection output of the PG pulse detector 51. The tracking control system 50 also includes a pilot signal detector 53 for detecting the pilot signal for auto-track finding (ATF) from the playback output of the recording/reproducing unit 30 and an adder 54 for summing detection outputs of the speed error detector 52 and the pilot signal detector 53. The tracking control system 50 further includes a tracking servo circuit 55 for generating tracking servo signals based on a sum output of the adder 54 and a capstan driving circuit 58 for controlling the tape running system of the recording/reproducing unit 30 based on the tracking servo signals.

The system controller 60 controls the recording data processing system 20, data recording/reproducing unit 30, reproducing data processing system 40 and the tracking control system 50 for recording the identification information for the last group also in the EOD area and causes the identification information for the last group to be read out from the EOD area.

An expansion circuit 70 operates, based on judgment by the system controller 60, to expand data compressed by the encoding circuit 11 during recording and to pass the data directly without data expansion if the data is the non-compressed data.

Output data of the expansion circuit 70 is outputted via interfacing controller 10 as playback data to the host computer 1.

In the data storage device of the above-described structure, the magnetic tape is caused to run during recording/reproduction at a pre-set running speed. The magnetic tape running speed is set so that the magnetic tape travels past two recording tracks during one complete revolution of the rotary drum. If data is recorded in this state, the magnetic heads $H_{w1}$, $H_{w2}$ complete one-track recording for each revolution of the rotary drum so that tracks with different azimuth tracks are formed alternatively.

Figure 2:
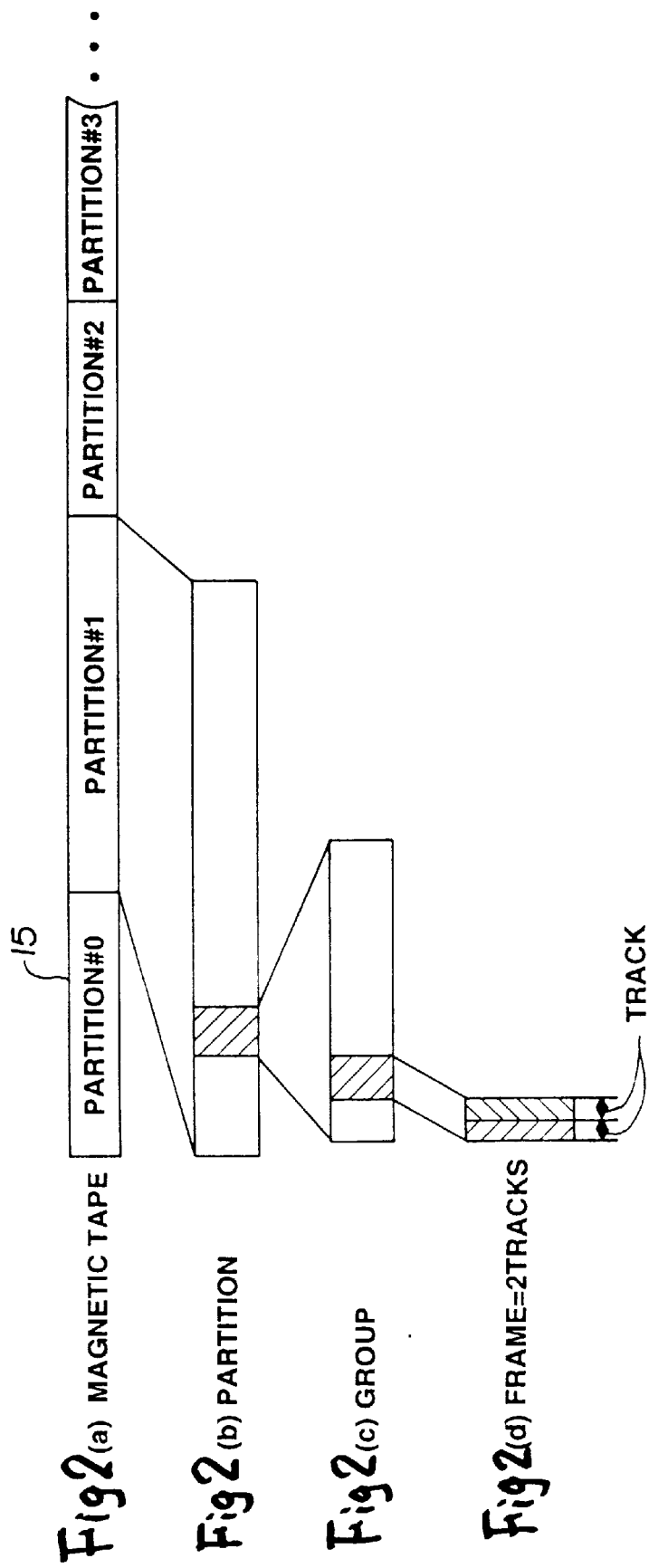
FIG. 2 illustrates the structure of data recorded on a magnetic tape by the data storage device shown in FIG. 1.

FIG. 2 shows the structure of data recorded on the magnetic tape. In FIG. 2(a), a sole magnetic tape 15 is shown only schematically. The sole magnetic tape 15 can be divided in terms of a partition as a unit, such that 256 partitions at the maximum can be set and supervised. To the partitions shown in FIG. 2 are accorded partitions numbers, such as partition numbers #0, #1, #2, #3, . . . for partition number based management.

Thus, in the present data storage device, data recording/reproduction can be done independently for the partitions. The data recording unit in each partition shown in FIG. 2(b) can be divided into fixed length units termed groups as shown in FIG. 2(c) such that data recording on the magnetic tape 15 is by the group-based unit.

In this case, one group corresponds to a data volume of 20 frames, each frame being formed by two tracks, as shown in FIG. 2(d). The two tracks making up a frame are directly neighboring tracks having a plus azimuth and a minus azimuth. Therefore, each group is formed by 40 tracks.

Figure 3:
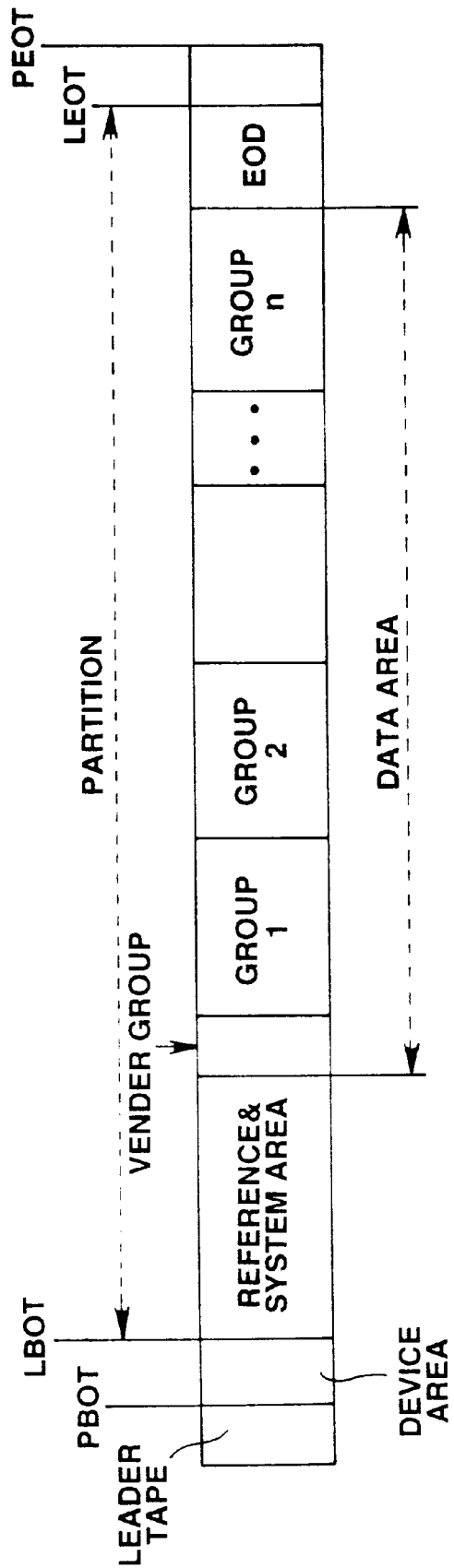
FIG. 3 illustrates the format of a data structure in a partition of the magnetic tape.

Each partition shown in FIGS. 2(a) or 2(b) is of a data structure shown in FIG. 3. In FIG. 3, it is assumed that one partition is formed for the overall tape length.

In the case of FIG. 3, a leader tape is disposed physically at the leading end of the magnetic tape. The leader tape is followed by a device area operating as an area for tape cassette loading/unloading. The leading end portion of the device area is the leading end position or physical beginning of tape PBOT. The device area is followed by a reference and system area for storage of the tape format information or the tape use hysteresis information, which is followed by a data area. The leading end of the reference and system area is the logical beginning of tape (LBOT).

In this data area, a vendor group specifying the information concerning the vendor initially preparing and furnishing the data is formed first of all. The vendor group is followed by groups shown in FIG. 2(c), herein the groups 1 to n, are formed in succession. The last group n is followed by an end-of-data (EOD) area specifying the end of the data area of the partition. The trailing end of the EOD is the logical end of tape (LEOT) specifying the physical end position of the partition. A device area may optionally be provided at back of the EOD.

Figure 4A:
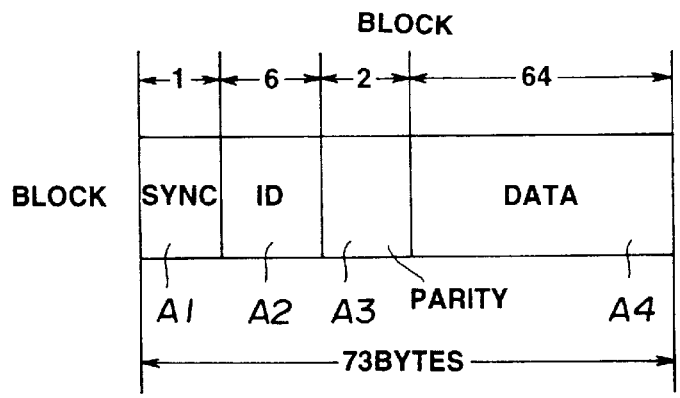
FIG. 4 illustrates the data structure of a track on the magnetic tape.
Figure 4B:
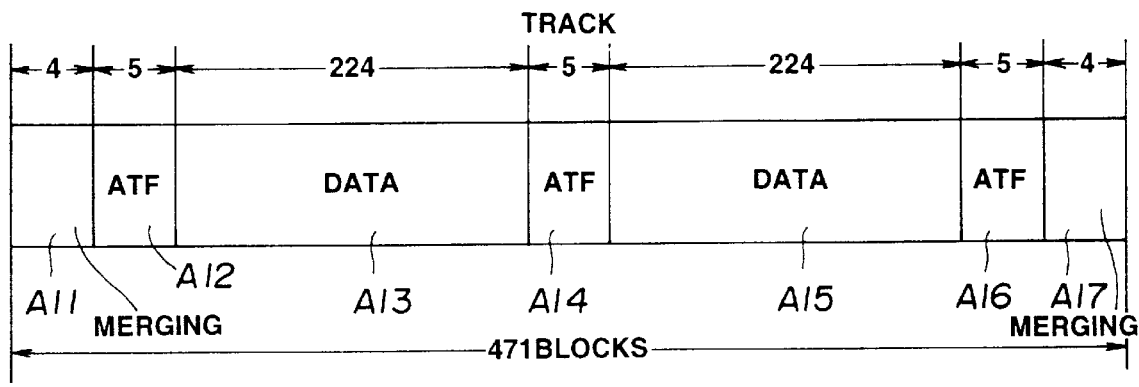

The one-track data structure shown in FIG. 2(d) is as shown in FIG. 4(a) and 4(b). FIG. 4(a) shows the block-based data structure. Each block is constituted by a 1-byte sync data area A1, followed by a 6-byte ID area A2, used for searching, a 2 byte parity area for error correction for ID data, and by a 64-byte data area A4.

The 1-track data shown in FIG. 4(b) is constituted by a sum total of 471 blocks, each track having at either ends 4-block margin areas A11, A17, and ATF areas A12 and A16 for tracking control at back of the margin area A11 and ahead of the margin areas A17, respectively. At a mid position of the track is formed an ATF area A14. Each of the ATF areas A12, A14 and A16 is a 5-block area. A 224-block data area A13 is provided between the ATF areas A12 and A14, while a 224-block data area A15 is provided between the ATF areas A14 and A16. Therefore, the total data area in one track (A13 and A15) specifies 224×2=448 blocks of the sum total of 471 blocks.

Figure 4C:
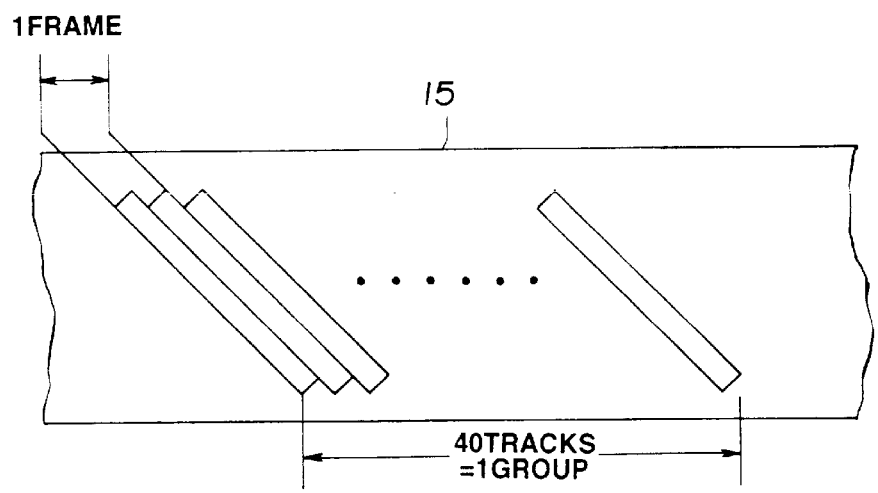

The above tracks are physically recorded on the magnetic tape 15 as shown in FIG. 4(c) such that a group is formed by 40 tracks or 20 frames.

The ID area A2 shown in FIG. 4(a) includes a 9-bit physical block address followed by a 39-bit ID information area.

Since the total data area in one track (A13 and A15) is made up of 448 blocks, the number of the physical block addresses contained in the total data area is also 448. To these 448 physical block addresses are sequentially accorded the address values of 0 to 447 in decimal representation beginning from the address 0 disposed at the leading end of the track.

This renders it possible for the recording/reproducing device to optimally deal with the information of the ID information area contained in the data area in one track. The data size of the ID information area contained in the data area in one track is 2184 bytes, as may be found by calculations of 39 bits×448 blocks=17472 bits=2184 bytes.

In the ID information area are stored, in a fitting fashion, the ID information, as now enumerated, in respective 2184-byte information areas contained in the data area on a sole track, in accordance with a pre-set rule. For assuring reliable readout of the ID information by the data storage device, the ID area information of the same sort is recorded a plural number of times in each track in accordance with a pre-set rule.

The ID information may be typified by the row format ID of 16 bits specifying the basic format type for the magnetic tape, a logical format ID of 8 bits specifying the recording format type actually in use, and a logical frame ID of 8 bits.

The logical frame ID is made up of a last-frame ID of 1 bit, specifying whether or not the current frame including the ID area is the last frame in the group, an ECC frame ID of 1-bit, specifying whether or not the recording data of the data area of the current frame is added to with the error correction code (ECC) and a logical frame number of 6 bits specifying which number frame in the group is the frame under consideration.

The ID information may be typified by a partition ID of 16 bits specifying the partition number of the partition including the current frame, an area ID of 4 bits specifying to which area belongs to the frame under consideration, data ID of 4 bits specifying the processing form type of data according to the recording format and N-position of 4 bits and N-repeat of 4 bits defining the information concerning the multiple recording mode.

The ID information may further be typified by the count information, such as the group count of 24 bits, file mark count of 32 bits, save-set mark count of 32 bits, record count of 32 bits or the absolute frame count of 24 bits, the data append position information effective in appending data, and reserved area for future appendage of the ID area information.

The group count specifies the total number of groups up to the group containing the frame under consideration in the current partition. The file mark specifies the total number of file marks contained as from the start position up to the current group. The file mark is the information specifying the demarcation of the data file in one partition.

The save-set mark count specifies the total number of file marks contained from the start position up to the current group in the current partition. The save-set mark is the information specifying the demarcation of the data-save points.

The record count specifies the total number of records contained as from the start position up to the current group. The absolute count specifies the total number of frames contained from the start position up to the current group in the current partition.

In the data storage device of the present embodiment, the count information of the last group n shown in FIG. 3, and the data appendage point, among the ID information stored in the ID area on the group-basis, are also written in the EOD area under control by the system controller 60.

The respective portions of the tape format shown in FIG. 3 are distinguished by the 4-bit definition of the area ID. For example, if the area ID is '0000', '0001', '0100' or '0101', the designated portions are device area, reference area, data area or EOD area, respectively.

The EOD area is prescribed so as to be recorded on the magnetic tape 15 as area made up of substantially 300 frames. In this EOD area is usually recorded the absolute frame count in sequence for all frames. Thus, in the present data storage device, the count information excluding the absolute frame count of the last group n and the data appendage point information are newly recorded in the EOD.

The operation of the present data storage device is now explained. In the present data storage device, recording data is supplied from the host computer 1 via the interfacing controller 10. When fed over bus 12 with the recording data, the interfacing controller 10 supplies the recording data thus fed to the index appendage unit 21 and to the ID information unit 22.

When fed with the recording data from the interfacing controller 10, the index appendage unit 21 appends to the supplied recording data the index information and sends the resulting data to the ECC encoding unit 23. The index information is used for recognizing a series of recording data in terms of 40 tracks or 20 frames as a unit, each frame corresponding to 2 tracks.

The ECC encoding unit 23 generates C3 parity of a data string along the track width, for each unit of the recording data furnished from the index appendage unit 21, and appends the C3 parity to the 20-frames of the recording data. The ECC encoding unit 23 also generates for each block to append the generated parity data to the block data, while generating the C2 parity of the data string along the track direction, dividing the C2 parity in two portions and allocating the two portions to both end portions of the main data area of each track as later explained.

The ID information generator 22 generates the ID information and block addresses of the respective blocks based on the recording data entered via interfacing controller 10.

The ID information appendage unit 24 appends the block addresses from the ID information generator 22 to the recording data to which the C1, C2 and C3 parity data have been appended by the ECC encoding unit 23. The ID information appendage unit 24 allocates the ID information generator 22 to the ID areas of the respective blocks. The ID information appendage unit 24 appends to the ID area in the EOD the above-mentioned count information of the last group n and the data appendage point information under control by the system controller 60.

The header parity appendage unit 25 generates 2-byte header parity for error correction for block addresses appended to the recording data by the ID information appendage unit 24 and appends the 2-byte header parity to the recording data. This allocates the 2-byte header parity to a position directly after the block address of each block.

The 8/10 modulation unit 26 converts the recording data of the main data area and recording data of each block of two subareas, to which header parity data has been appended by the header parity appendage unit 25, from 8 bits into 10 bits, on the byte basis, so that the dc level of the recording signal, will be maintained approximately at a 0 level.

The synchronization signal appendage unit 27 appends the synchronization signal, on the block basis, to the leading end of recording data converted by the 8/10 converter 26 from 8 bits to 10 bits. The recording data, thus formed, is fed to the pilot signal appendage unit 28.

The pilot signal appendage unit 28 generates ATF pilot signals and appends the pilot signals for ATF to the recording data to send the resulting data via amplifier 29 to the magnetic heads $H_{w1}$, $H_{w2}$. This allows the magnetic heads $H_{w1}$, $H_{w2}$ to scan the magnetic tape for recording the data. On the magnetic tape, a recording track is formed in accordance with a pre-set format.

The system controller 60 controls the ID information generator 22 for writing the ID information in the ID area of each block and for writing the count information, such as the above-mentioned group count of 24 bits of the last group, file mark count of 32 bits, save-set mark count of 32 bits, record count of 32 bits and the data appendage point information, in the ID area of the EOD area.

In reproducing the magnetic tape 15, recorded as described above, the data storage device controls the rotation of the rotary drum 31 so that the rpm of the rotary drum 31 will be equal to that used for recording, while controlling the running of the magnetic tape 15 so that the magnetic tape 15 will run at a constant speed. This causes the magnetic heads $H_{r1}$, $H_{r2}$ and $H_{r2d}$ for reproduction will scan the magnetic tape 15 in a slanted position so that the magnetic heads $H_{r1}$, Hr$_2$ and $H_{r2d}$ supply the playback output corresponding to the recording track via amplifier 41 to the synchronization signal detector 42.

The synchronization signal detector 42 detects the synchronization signal from the playback output supplied thereto to convert the playback output into binary signals by clocks synchronized to these synchronization signals for generating playback data which is then supplied to the 8/10 demodulation unit 43.

The 8/10 demodulation unit 43 converts the playback data from the synchronization signal detector 42 from 10-bit data to 8-bit data which is supplied to the header parity detector 44. The header parity detector 44 parity-checks the block addresses using the above-mentioned 2-byte header parity. The ID information separator 45 sends the data of the block of the main area, having the correct block address, parity-checked by the header parity detection unit 44, to the error correction processor 46, while separating the ID information from the subarea block to route the separated information to the system controller 60.

The error correction processor 46 error-corrects the playback data of the respective blocks from the ID information separator 45, using the C1 parity, appended on the block basis, while error-correcting the data strings in the track direction, using the C2 parity appended to both end portions of the data area of each track, and error-correcting the data strings in the track width direction using the above-mentioned C3 parity. The error correction processor 46 then furnishes the error-corrected recording data to the buffer 47.

The index separator 48 reads out the unit-based playback data held by the buffer after error correction by the error correction processor 46, and separates the index information to send the separated information to the interfacing controller 10 via expansion circuit 70. The interfacing controller 10 sends the playback data from the index separator 48 to the host computer 1.

The system controller 60 grasps the location of data of each group, using the ID information separated by the ID information separator 45. The system controller 60 takes in the count information of the last group n and the data appendage point stored in the EOD area in order to grasp the count information of the last group even if the last group cannot be read for some reason and in order to continue recoding in case of, for example, data appendage.

Figure 5:
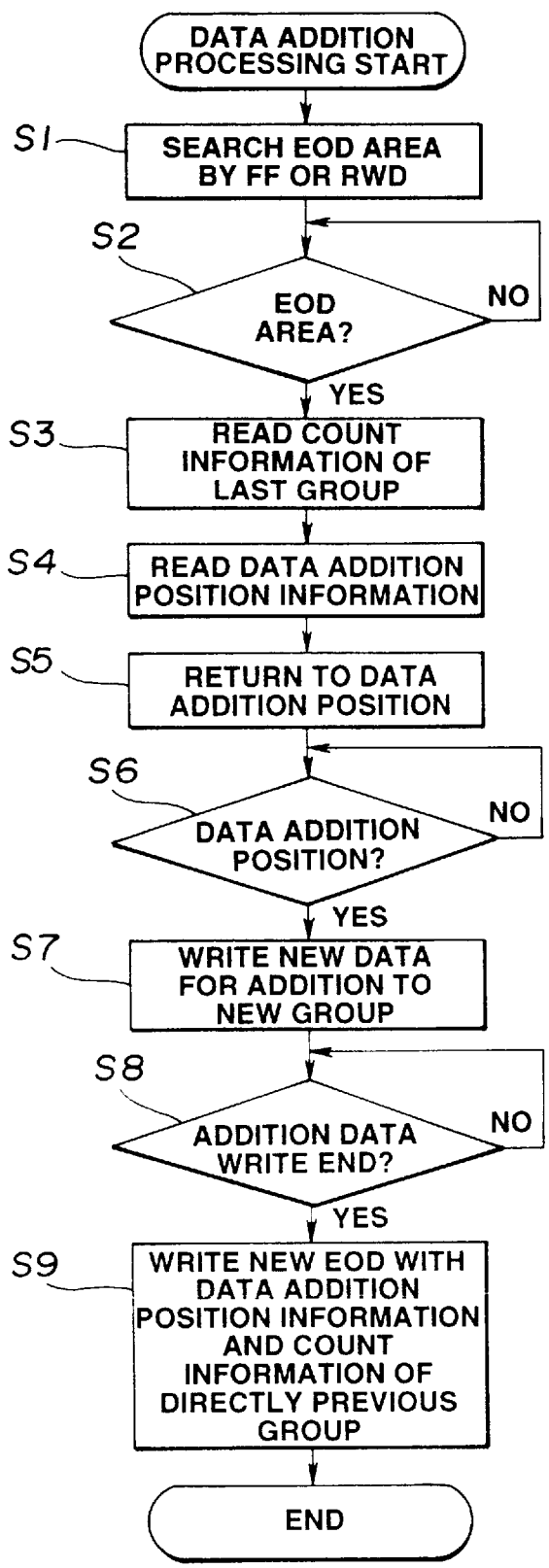
FIG. 5 is a flowchart for illustrating the operation of data appendage to the data storage device shown in FIG. 1.

If, for example, data is to be appended by the present data storage device, the system controller 60 controls the recording data processing system 20, data recording/reproducing unit 30, playback data processing system 40 and the tracking control system 50, as shown by a flowchart of FIG. 5, for recording new data (group n+l) in continuation to the previously written last group.

Referring to FIG. 5, the system controller 60 fast feeds or rewinds the magnetic tape 15 by the data recording/reproducing unit 30 and the tracking control system 50, in order to search the EOD area, as shown at step S1. Specifically, the ID information separator 45 checks the ID area, as shown at step S2, in order to continue the search until a detection result that the EOD area has been detected is obtained.

If, as a result of decision at step S2, a signal specifying the detection of an EOD area is supplied from the ID information separator 45 to the system controller 60, the system controller 60 reads the count information and the data appendage information in the EOD area, as shown at steps S3 and S4. In effect, the ID information separator 45 detects the ID information in the EOD area in order to apprize the system controller 60 of the result of detection.

The system controller 60 then is responsive to the data appendage point information to control the tracking control system 50 to rewind the magnetic tape 15 as shown at step S5. Thus the magnetic drum 31 is reverted to the data appendage point until the result of decision at step S6 is YES.

The system controller 60 then controls the recording data processing system 20, data recording/reproducing unit 30 and the tracking control system 50 to write appended data to the new group G(n+1), as shown at step S7.

Figure 6:
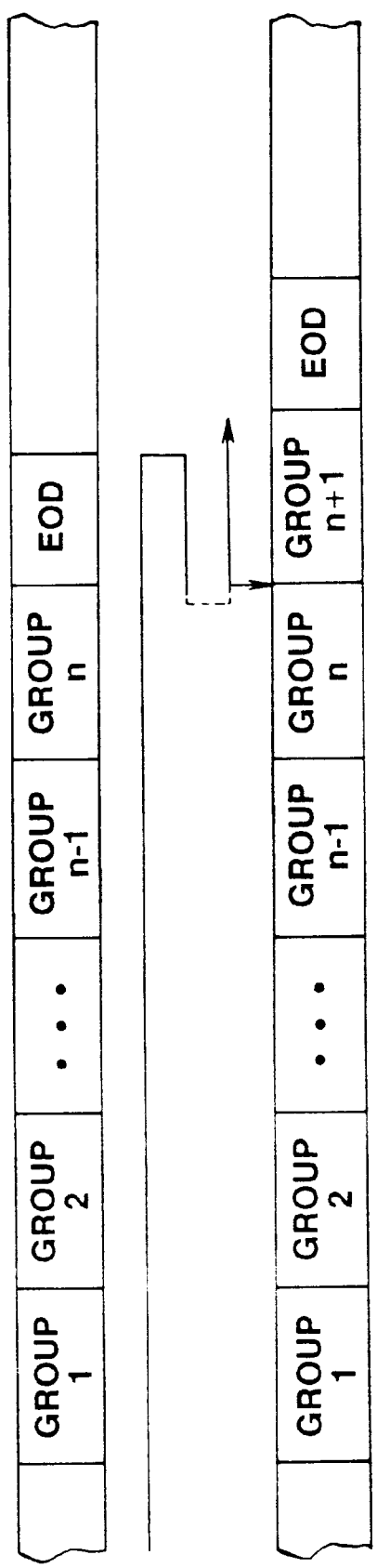
FIG. 6 is a schematic view of a magnetic tape to which data has been appended by the data storage device shown in FIG. 1.

By the operation shown at step S1 to S7, the group n+1 of new data is appended to the last group n, as shown in FIG. 6.

After the decision YES is given at step S8 and writing of new data comes to a close, the system controller 60 proceeds to step S9 to write the data appendage point information and the count information of the directly previous group in the new EOD.

The data storage device can execute data appendage processing without the necessity of reading the last written group, so that, if the last group cannot be read for some reason, the data storage device of the present embodiment can continue data writing.

In the above-described embodiment, the present invention is applied to a data storage device. However, the present invention can be applied to any recording device for digitally recording the recording data, such as, for example, a digital video tape recorder.

What is claimed is:

1. A data recording apparatus for recording grouped recording data and identification information on a tape-shaped recording medium comprising:

recording data processing means for appending the identification information to said recording data by recording processing and providing processed signals;

recording means for recording the signals supplied from said recording data processing means on said tape-shaped recording medium;

tracking control means for controlling a tape running system of said recording means; and control means for controlling said recording data processing means, said recording means and said tracking control means for recording the identification information of a last group in an end-of-data area on said tape-shaped recording medium, wherein said identification information of a last group recorded in said end-of-data area includes count information including group count information, file mark count information, save-set mark count information, record count information, and data appendage point information.

2. The data recording apparatus as claimed in claim 1 wherein the identification information includes at least an area ID specifying to which group belongs the recording data to which the identification information is appended and count information specifying a total number of groups already recorded on said tape-shaped recording medium, and wherein the data recording apparatus further includes means for appending the identification information of the last group to data recorded in said end-of-data area under control by said control means.

3. The data recording apparatus as claimed in claim 2 wherein said control means causes the identification information of the last group to be recorded in an identification information area in said end-of-data area.

4. A data reproducing apparatus for reproducing grouped recording data and identification information recorded on a tape-shaped recording medium comprising:

read-out means for reading out the grouped recording data and the respective identification information from the tape-shaped recording medium;

playback data processing means for performing signal reproducing processing on a read-out output from the read-out means for producing a playback output;

tracking control means for controlling a tape-shaped recording medium running system of said read-out means; and control means for controlling the read-out means, the playback data processing means and the tracking control means for detecting an end-of-data area on said tape-shaped recording medium and for reproducing the identification information for a last group of the recording data contained in said end-of-data area, wherein said identification information for a last group of the recording data contained in said end-of-data area reproduced by said control means includes count information including group count information, file mark count information, save-set mark count information, record count information, and data appendage point information.

5. The data reproducing apparatus as claimed in claim 4, wherein said control means detects the end-of-data area based on an area ID contained in the identification information from said read-out means.

6. The data reproducing apparatus as claimed in claim 4 wherein the identification information includes at least appendage point information specifying a data appendage point and count information specifying a total number of groups recorded on said tape-shaped recording medium.

7. The data reproducing apparatus as claimed in claim 6 wherein said control means controls said tracking control means based on said appendage point information in the identification information read out by said read-out means and thereby rewinds the tape-shaped recording medium.

8. The data reproducing apparatus as claimed in claim 6 wherein said identification information further includes an area ID specifying a group to which belongs said recording data to which is appended the identification information, and wherein said control means detects the end-of-data area based on said area ID contained in the identification information from said read-out means and reproduces the identification information of the last group of the recording data already recorded on said tape-shaped recording medium without running the tape-shaped recording medium up to said last group.

* * * * *